US012775079B1

(12) United States Patent
Piggott et al.

(10) Patent No.: US 12,775,079 B1
(45) Date of Patent: Oct. 27, 2026

(54) OPTIMIZATION OF BEAM MODULATION IN COHERENT SENSING DEVICES

(71) Applicant: Waymo LLC, Mountain View, CA (US)

(72) Inventors: Alexander Yukio Piggott, Mountain View, CA (US); Chung Lam, Mountain View, CA (US); Yunshan Jiang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 886 days.

(21) Appl. No.: 18/091,948

(22) Filed: Dec. 30, 2022

(51) Int. Cl.

| | |
|---|---|
| ***G01S 7/497*** | (2006.01) |
| ***G01S 7/481*** | (2006.01) |
| ***G01S 7/4911*** | (2020.01) |
| ***G01S 17/931*** | (2020.01) |

(52) U.S. Cl.
CPC ............ *G01S 7/497* (2013.01); *G01S 7/4814* (2013.01); *G01S 7/4911* (2013.01); *G01S 17/931* (2020.01)

(58) Field of Classification Search
USPC ........................................................ 356/4.01
See application file for complete search history.

(56) References Cited

U.S. PATENT DOCUMENTS

| | | | | |
|---|---|---|---|---|
| 10,838,061 | B1 * | 11/2020 | Crouch | G01S 17/36 |
| 11,422,258 | B2 * | 8/2022 | Thorpe | G01S 7/4912 |
| 2006/0227316 | A1 * | 10/2006 | Gatt | G01S 7/4811 356/5.11 |
| 2010/0172383 | A1 * | 7/2010 | Montalvo | H01S 5/0683 372/38.01 |
| 2013/0011138 | A1 * | 1/2013 | Kim | H04L 27/2697 398/79 |
| 2021/0356592 | A1 | 11/2021 | Behroozpour | |
| 2022/0365214 | A1 * | 11/2022 | Sandborn | G01S 17/42 |
| 2023/0113820 | A1 * | 4/2023 | Canoglu | H01S 5/0612 356/4.01 |
| 2024/0339801 | A1 * | 10/2024 | Di | G06N 3/084 |

OTHER PUBLICATIONS

"Introduction to Loss Functions"; Algorithmia.com website (originally) now DataRobot.com (full URL included in ref.); last updated Mar. 26, 2021 (Year: 2021).*

* cited by examiner

*Primary Examiner* — Yuqing Xiao
*Assistant Examiner* — Clint Thatcher
(74) *Attorney, Agent, or Firm* — Christensen O'Connor Johnson Kindness PLLC

(57) ABSTRACT

The subject matter of this specification can be implemented in, among other things, systems and methods of optical sensing that use optimization techniques to improve quality of optical modulation of sensing beams in optical sensing devices. Described, among other things, is a system that uses a control signal to impart modulation to a transmitted (TX) beam generated by a sensing device. The system generates, using the modulated TX beam, a first reference beam and a second reference beam, the first reference beam being time-delayed relative to the second reference beam. The system identifies, using the first reference beam and the second reference beam, a tuning correction to the control signal. The tuning correction is identified based on a loss function evaluating a difference between the modulation and a target modulation. The system then uses the tuning correction to reduce this difference.

17 Claims, 7 Drawing Sheets

400

OPTIMIZATION OF BEAM MODULATION IN COHERENT SENSING DEVICES

TECHNICAL FIELD

The instant specification generally relates to range and velocity sensing in applications that involve determining locations and velocities of moving objects using optical signals reflected from the objects. More specifically, the instant specification relates to preparation of sensing beams and processing of beams reflected from external objects, for identification of various characteristics of those objects.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (or towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on Global Navigation Satellite System (GNSS) data and road map data. While the GNSS and the road map data can provide information about static aspects of the environment (such as buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
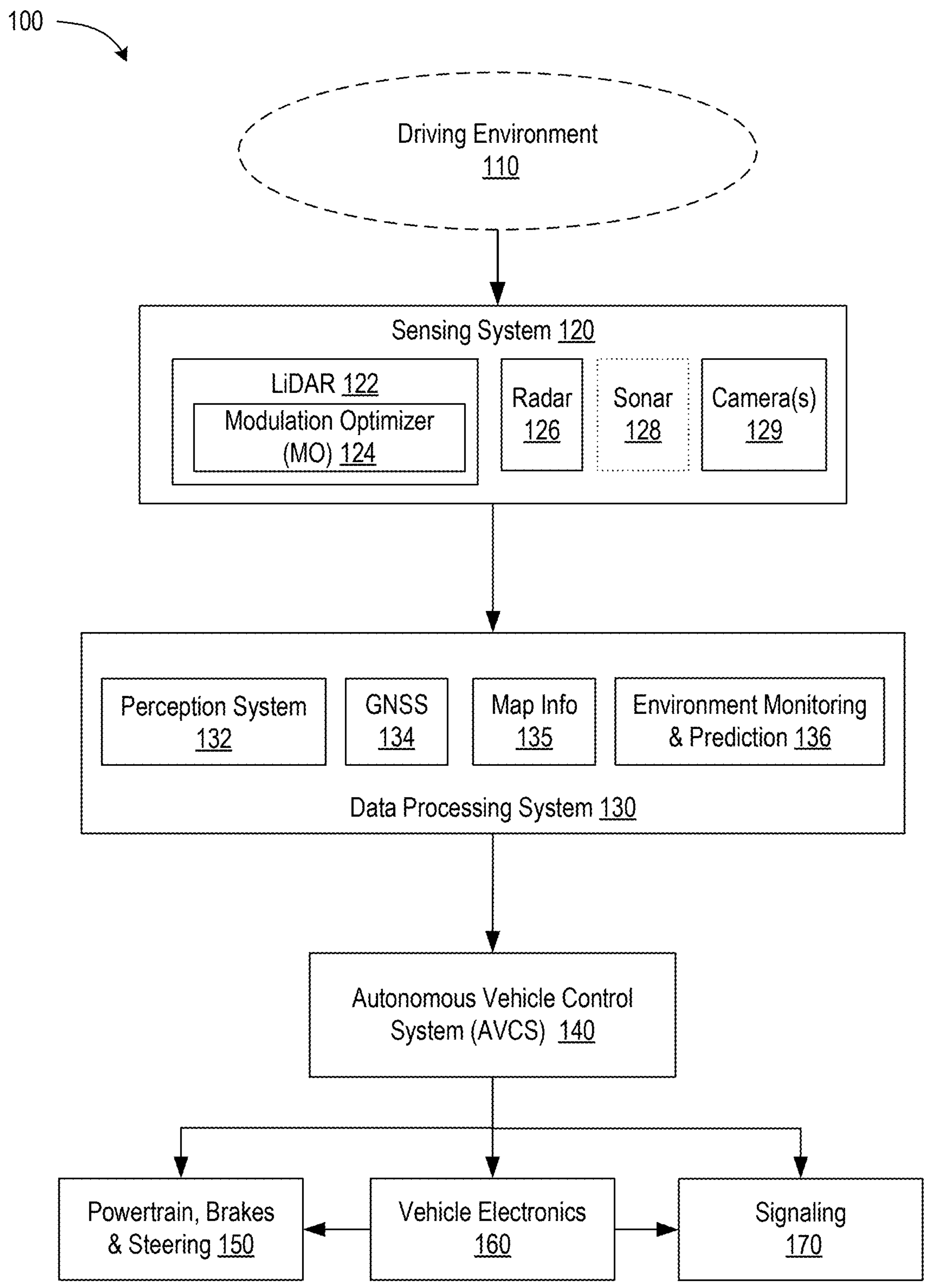
FIG. 1 is a diagram illustrating components of an example autonomous vehicle that can deploy feedback optimization for accurate modulation of sensing beams, in accordance with some implementations of the present disclosure.

In one implementation, disclosed is a system that includes one or more electronic circuits configured to generate a control signal to impart a modulation to a transmitted (TX) beam. The system further includes an optical system configured to generate, using the TX beam, a first reference beam and a second reference beam, wherein the first reference beam is time-delayed relative to the second reference beam. The one or more electronic circuits are further configured to identify, using the first reference beam and the second reference beam, a tuning correction to the control signal. To identify the tuning correction, the one or more electronic circuits are configured to evaluate, based on a loss function, a difference between the modulation and a target modulation. The one or more electronic circuits are further to use the tuning correction to reduce the difference between the modulation and the target modulation.

In another implementation, disclosed is a lidar apparatus that includes a photonic integrated circuit (PIC). The PIC includes a light source configured to generate a TX beam. The PIC further includes one or more beam splitters configured to generate, using the TX beam, a first reference beam and a second reference beam. The PIC further includes an optical delay line configured to time-delay the first reference beam relative to the second reference beam. The PIC further includes a coherent photodetector stage configured to obtain a phase information representative of a difference between the first reference beam and the second reference beam. The lidar apparatus further includes one or more electronic circuits configured to generate a control signal that causes a modulation to be imparted to the TX beam, the first reference beam, and the second reference beam. The one or more electronic circuits are further to identify, using the phase information, a tuning correction to the control signal, wherein to identify the tuning correction the one or more electronic circuits are configured to evaluate, based on a loss function, a difference between the modulation and a target modulation. The one or more electronic circuits are further to use the tuning correction to reduce the difference between the modulation and the target modulation.

In another implementation, disclosed is a method that includes generating a control signal and using the control signal to impart a modulation to a TX beam produced by a lidar device. The method further includes generating, using the modulated TX beam, a first reference beam and a second reference beam, wherein the first reference beam is time-delayed relative to the second reference beam. The method further includes identifying, using the first reference beam and the second reference beam, a tuning correction to the control signal, wherein identifying the tuning correction includes evaluating, based on a loss function, a difference between the modulation and a target modulation. The method further includes using the tuning correction to reduce the difference between the modulation and the target modulation.

DETAILED DESCRIPTION

An autonomous vehicle (AV) or a driver-operated vehicle that uses various driver-assistance technologies can employ light detection and ranging (lidar) systems to detect distances to various objects in the environment and/or velocities of such objects. A lidar emits one or more laser signals (pulses) that travel to an object and then detects incoming signals reflected from the object. By determining a time delay between the signal emission and the arrival of the reflected waves, a time-of-flight (ToF) lidar can determine the distance to the object. A typical lidar emits signals in multiple directions to obtain a wide view of the driving environment of the AV. The outside environment can be any environment including any urban environment (e.g., a street, and a sidewalk), rural environment, highway environment, indoor environment (e.g., the environment of an industrial plant, a shipping warehouse, and a hazardous area of a building), marine environment, and so on. The outside environment can include multiple stationary objects (e.g., roadways, buildings, bridges, road signs, shoreline, rocks, and trees), multiple movable objects (e.g., vehicles, bicyclists, pedestrians, animals, ships, and boats), and/or any other objects located outside the AV. For example, a lidar device can cover (e.g., scan) an entire 360-degree view by collecting a series of consecutive frames identified with timestamps. As a result, each sector in space is sensed in time increments that are determined by the angular velocity of the lidar's scanning speed. Sometimes, an entire 360-degree view of the outside environment can be obtained over a scan of the lidar. Alternatively, any smaller sector, e.g., a 1-degree sector, a 5-degree sector, a 10-degree sector, or any other sector can be scanned, as desired.

ToF lidars can also be used to determine velocities of objects in the outside environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$, as the ToF technology does not allow to ascertain whether the object maintained the same velocity v during this time or experienced an acceleration or deceleration (with detection of acceleration/deceleration requiring additional locations $\vec{r}(t_3)$, $\vec{r}(t_4)$ . . . of the object). Coherent or Doppler lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A signal emitted by a coherent lidar can be modulated (in frequency and/or phase) with a radio frequency (RF) signal prior to being transmitted to a target. A local oscillator (LO) copy of the transmitted signal can be maintained on the lidar and mixed with a signal reflected from the target; a beating pattern between the two signals can be extracted and Fourier-analyzed to determine the Doppler frequency shift of $f_D$ and signal travel time t to and from the target. The (radial) velocity V of the target relative to the lidar and the distance L to the target can then be determined as $$V = \frac{cf_D}{2f},\ L = \frac{c\tau}{2}.$$

where c is the speed of light and f is the optical frequency of the transmitted signal. More specifically, coherent lidars can determine the velocity of the target and the distance to the target by correlating phase information $\phi_R(t)$ of the reflected signal with phase modulation $\phi_{LO}(t-\tau)$ of the time-delayed local oscillator (LO) copy of the transmitted signal. The correlations can be analyzed in the Fourier domain with a peak of the correlation function identifying the time of flight τ.

Figure 3A:
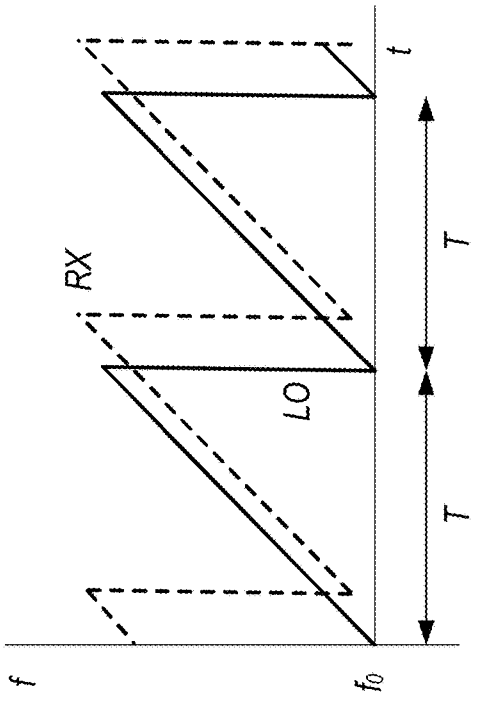
FIGS. 3A-3B depict schematically target frequency modulations and FIGS. 3C-3D depict schematically measured frequency modulations that depart from the target frequency modulations, for an example sensing system.
Figure 3B:
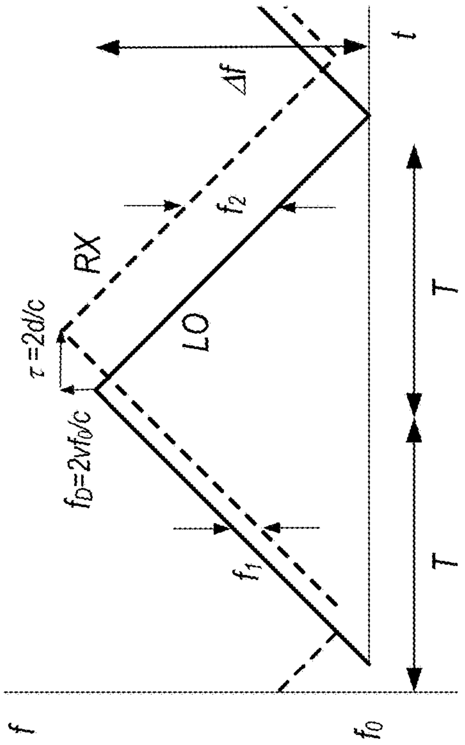

In frequency-modulated continuous wave (FMCW) lidars, typical frequency modulation schemes include a saw tooth (ST) modulation (a series of up or down chirps followed by a quick reset to a base frequency, e.g., as illustrated in FIG. 3A) or an up-and-down (UD) modulation (linear up-chirps interspersed with down-chirps, e.g., as illustrated in FIG. 3B). A common UD modulation includes a linear increase of the carrier frequency $f(t)=f_0+\alpha t$ for a duration of the up-chirp portion ($0<t<T$), in which the frequency increases linearly with time with a chirp rate α from a base frequency $f_0$ by a total amount of the chirp bandwidth $\Delta f=\alpha T$ over the course of the interval T of the up-chirp. The up-chirp is then followed by a down-chirp, $f(t)=f_0+\alpha(2T-t)$, which can be occur for the same time duration ($T<t<2T$), so that the light frequency f(t) returns to the same base value $f_0$ at time t=2T, at which point a new UD modulation sequence is applied.

Detection of distances to objects and velocities of those objects can be performed by comparing a phase of the LO copy (depicted with the solid lines in FIGS. 3A-3B) of the transmitted beam with a phase of a received (RX) beam (depicted with the solid lines in FIG. 3A-3B). The RX beam can experience a Doppler frequency shift $f_D=2vf_0/c$ (caused by relative motion of a target object and the lidar) and a time delay $\tau=2d/c$ (caused by beam propagation to and from the target). The Doppler shift and the time delay cause beatings to occur in the difference of the two beams, with the beating frequency $f_1$ associated with the up-chirp portion, $f_1=f_{RX}-f_{LO}=(2/c)\ (vf_0-d\Delta f/T)$, and the beating frequency $f_2$ associated with the down-chirp portion, $f_2=f_{RX}-f_{LO}=(2/c)\ (vf_0+d\Delta f/T)$. The distance to the object can then be determined as $d=cT(f_2-f_1)/(4\Delta f)$ and the velocity of the object as $v=c(f_1+f_2)/(4f_0)$, where a positive value of the velocity v>0 indicates that the object is moving towards the lidar and a negative value $v<0$ indicates that the object is moving away from the lidar.

Accuracy of velocity and/or distance determination depends on the precision with which the modulation follows a linear time dependence set by the target chirp rate $\alpha=\Delta f/T$. Common techniques of generating chirped beams include applying a voltage, a current, or some other suitable control signal $X(t)$ to a laser or an optical modulator positioned along the optical path of the beam, and/or similar techniques. Chirp non-linearities broaden beating frequencies, decrease signal-to-noise ratios, and significantly degrade accuracy of sensing. Most tunable lasers or optical modulators do not respond linearly to control signals $X(t)$, which results in nonlinear chirps, e.g., chirps that are illustrated schematically in FIG. 3C (for the ST modulation) and FIG. 3D (for the UD modulation), unless the control signal is pre-distorted to compensate for the non-linearities. A predetermined fixed compensation applied to the control signal $X(t)$, however, does not account for variations in environmental conditions, such as changed temperature, humidity, and the like, and fails to compensate for long-term changes occurring as a result of aging of the laser and/or other optical components of the sensing system.

Aspects and implementations of the present disclosure address these and other challenges of the existing sensing technology by providing for methods and systems that deploy a feedback loop that eliminates or significantly reduces chirp non-linearities while also accurately maintaining the desired target chirp rate $\alpha$. In some implementations, the feedback loop can be used to evaluate a copy of the transmitted beam and obtain an estimate of a degree of chirp non-linearity. A tuning correction $Y(t)$ can be used to modify the control signal, $X(t)\rightarrow X(t)+Y(t)$. The tuning correction $Y(t)$ can be determined using one or more optimization techniques disclosed herein to minimize or reduce a difference between the target frequency $f_{target}(t)$ and the actual frequency $f_{measured}(t)$ measured or estimated using the feedback loop. The determined tuning correction is then applied for modulation of the chirped beams causing the signal to move closer to the target frequency $f_{target}(t)$, e.g., as illustrated in FIG. 3A and/or FIG. 3B.

The advantages of the disclosed implementations include, but are not limited to, elimination or significant reduction of chirp non-linearities in frequency modulated sensing systems for accurate determination of velocities and distances to various external objects. This, in turn, improves safety of many lidar-based applications, including but not limited to autonomous vehicle driving missions.

FIG. 1 is a diagram illustrating components of an example autonomous vehicle (AV) 100 that can deploy feedback optimization for accurate modulation of sensing beams, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, and sidewalk delivery robotic vehicles) capable of being operated in a self-driving mode (without a human input or with a reduced human input).

Vehicles, such as those described herein, can be configured to operate in one or more different driving modes. For instance, in a manual driving mode, a driver can directly control acceleration, deceleration, and steering via inputs such as an accelerator pedal, a brake pedal, a steering wheel, etc. A vehicle can also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles can be known by different names including, for example, autonomously driven vehicles, self-driving vehicles, and so on.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle can perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 110 can be urban, suburban, rural, and so on. In some implementations, the driving environment 110 can be an off-road environment (e.g. farming or agricultural land). In some implementations, the driving environment can be inside a structure, such as the environment of an industrial plant, a shipping warehouse, a hazardous area of a building, and so on. In some implementations, the driving environment 110 can consist mostly of objects moving parallel to a surface (e.g., parallel to the surface of Earth). In other implementations, the driving environment can include objects that are capable of moving partially or fully perpendicular to the surface (e.g., balloons, and leaves falling). The term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. Radar unit 126 can deploy a sensing technology that is similar to the lidar technology but uses a radio wave spectrum of the electromagnetic waves. For example, radar unit 126 can use 10-100 GHz carrier radio frequencies. Radar unit 126 can be a pulsed ToF radar, which detects a distance to the objects from the time of signal propagation, or a continuously-operated coherent radar, which detects both the distance to the objects as well as the velocities of the objects, by determining a phase difference between transmitted and reflected radio signals. Compared with lidars, radar sensing units have lower spatial resolution (by virtue of a much longer wavelength), but lack expensive optical elements, are easier to maintain, have a longer working range, and are less sensitive to adverse weather conditions. An AV can often be outfitted with multiple radar transmitters and receivers as part of the radar unit 126. The radar unit 126 can be configured to sense both the spatial locations of the objects (including their spatial dimensions) and their velocities (e.g., using the radar Doppler shift technology). The sensing system 120 can include a lidar sensor 122 (e.g., a lidar rangefinder), which can be a laser-based unit capable of determining distances to the objects in the driving environment 110 as well as, in some implementations, velocities of such objects. The lidar sensor 122 can utilize wavelengths of electromagnetic waves that are shorter than the wavelength of the radio waves and can thus provide a higher spatial resolution and sensitivity compared with the radar unit 126. The lidar sensor 122 can include a ToF lidar and/or a coherent lidar sensor, such as a frequency-modulated continuous-wave (FMCW) lidar sensor, phase-modulated lidar sensor, amplitude-modulated lidar sensor, and the like. Coherent lidar sensors can use optical heterodyne detection for velocity determination. In some implementations, the functionality of the ToF lidar sensor and coherent lidar sensor can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor units can be mounted on an AV, e.g., at different locations separated in space, to provide additional information about a transverse component of the velocity of the reflecting object.

Lidar sensor 122 can include one or more laser sources producing and emitting signals and one or more detectors of the signals reflected back from the objects. Lidar sensor 122 can include spectral filters to filter out spurious electromagnetic waves having wavelengths (frequencies) that are different from the wavelengths (frequencies) of the emitted signals. In some implementations, lidar sensor 122 can include directional filters (e.g., apertures, diffraction gratings, and so on) to filter out electromagnetic waves that can arrive at the detectors along directions different from the reflection directions for the emitted signals. Lidar sensor 122 can use various other optical components (lenses, mirrors, gratings, optical films, interferometers, spectrometers, local oscillators, and the like) to enhance sensing capabilities of the sensors.

In some implementations, lidar sensor 122 can include one or more 360-degree scanning units (which scan the outside environment in a horizontal direction, in one example). In some implementations, lidar sensor 122 can be capable of spatial scanning along both the horizontal and vertical directions. In some implementations, the field of view can be up to 90 degrees in the vertical direction (e.g., with at least a part of the region above the horizon scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, at the near-infrared wavelength, but can include sensing technology that operate at other wavelengths as well.

Lidar sensor 122 can include an iterative modulation optimizer (MO) 124, which can use a combination of optical elements, electronic circuits hardware elements, and software/firmware modules to implement feedback optimization for accurate modulation of sensing beams transmitted by lidar sensor 122. MO 124 can deploy a variety of techniques described below in conjunction with FIGS. 2-7. For example, MO 124 can include an optical system (subsystem) that generates a feedback optimization for accurate modulation of sensing beams TX beam and multiple copies of the modulated TX beam. A first copy of the TX beam can be time-delayed relative to a second copy of the TX, and both copies can be inputted into a coherent photodetector to generate an electrical signal representative of a phase difference of the two copies. The one or more beating frequencies $f_1$, $f_2$ . . . (caused by the time delay) indicative of the quality (linearity) of the chirp in the modulated signal can be imprinted into the electrical signal. The difference between the measured chirp and the target chirp can then be estimated based on the electrical signal and used to determine a tuning correction Y(t) to the control signal X(t) that imparts modulation to the TX beam.

The electronic circuitry of MO 124 can include waveform generation for imparting frequency modulation to the TX beam. The electronic circuitry of MO 124 can further perform digital signal processing, which can include identification of beating frequencies $f_1$, $f_2$, etc., width (uncertainty) of the beating frequencies, accessing calibration data representative of a response of the light source to the control signal, and identification of the tuning correction Y(t) that minimizes the difference between the target modulated frequency of the light beam and a measured modulated frequency $f_{target}(t)-f_{measured}(t)$. In some implementations, reduction of this difference can be performed using a number of iterations, each iteration progressively reducing the difference based on the calibration data and the measured modulation. Additional elements and functions of MO 124 and various combinations of those elements/functions are further illustrated below in conjunction with FIGS. 2-7.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. Some of the cameras 129 of the sensing system 120 can be high resolution cameras (HRCs) and some of the cameras 129 can be surround view cameras (SVCs). The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the driving environment 110 and velocities (radial and transverse) of such objects. In some implementations, the perception system 132 can also receive the radar sensing data, which can similarly include distances to various objects as well as velocities of those objects. Radar data can be complementary to lidar data, e.g., whereas lidar data can include high-resolution data for low and mid-range distances (e.g., up to several hundred meters), radar data can include lower-resolution data collected from longer distances (e.g., up to several kilometers or more). In some implementations, perception system 132 can use the lidar data and/or radar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., lidar sensor 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The GNSS (or other positioning) data processing module 134 can use the positioning data (e.g., GNSS, GPS, and IMU data) in conjunction with the sensing data to help accurately determine the location of the AV with respect to fixed objects of the driving environment 110 (e.g. roadways, lane boundaries, intersections, sidewalks, crosswalks, road signs, curbs, and surrounding buildings) whose locations can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the moving objects. In some implementations, environment monitoring and prediction component 136 can keep track of the changing appearance of the driving environment due to motion of the AV relative to the environment. In some implementations, driving environment monitoring and prediction component 136 can make predictions about how various moving objects of the driving environment 110 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GNSS data processing module 134, and environment monitoring and prediction component 136 can be used by an autonomous driving system, such as AV control system (AVCS) 140. The AVCS 140 can include one or more algorithms that control how AV 100 is to behave in various driving situations and driving environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, and accelerating) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, etc.), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions outputted by the AVCS 140 can be delivered directly to the powertrain, brakes, and steering 150 (or signaling 170) whereas other instructions outputted by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2:
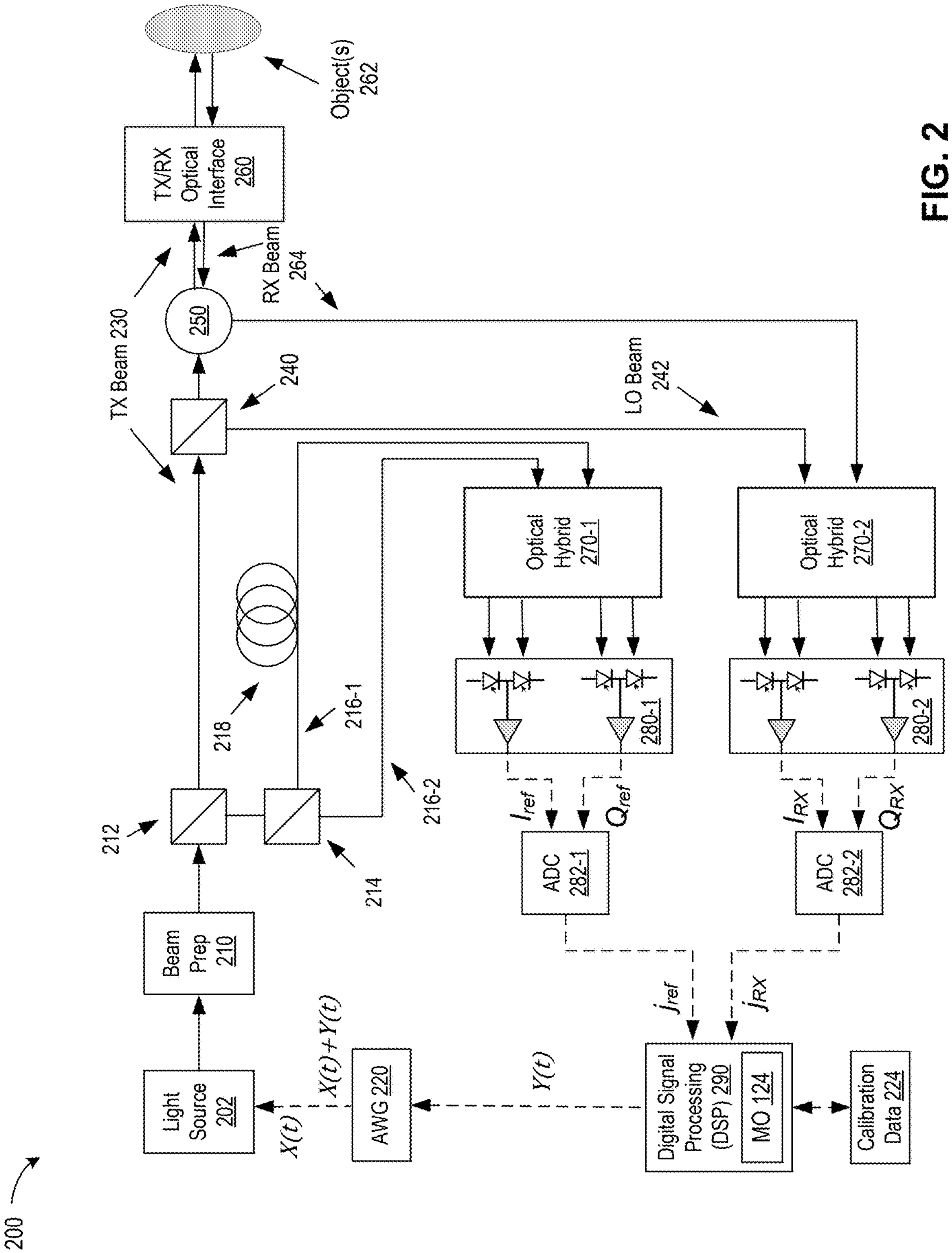
FIG. 2 is a block diagram illustrating an example sensing system capable of accurate modulation of sensing beams with feedback optimization, in accordance with some implementations of the present disclosure.

FIG. 2 is a block diagram illustrating an example sensing system 200 capable of accurate modulation of sensing beams with feedback optimization, in accordance with some implementations of the present disclosure. Sensing system 200 can be a part of lidar sensor 122 that includes MO 124. As depicted in FIG. 2, a light source 202 can produce one or more beams of light. "Beams" should be understood herein as referring to any signals of electromagnetic radiation, such as beams, wave packets, pulses, sequences of pulses, or other types of signals. Solid arrows in FIG. 2 (and other figures) indicate optical signal propagation whereas dashed arrows depict propagation of electrical (e.g., analog) signals or electronic (e.g., digital) signals. Light source 202 can be a broadband laser, a narrow-band laser, a light-emitting diode, and the like. Light source 202 can be a semiconductor laser, a gas laser, an ND: YAG laser, or any other type of a laser. Light source 202 can be a continuous wave laser, a single-pulse laser, a repetitively pulsed laser, a mode locked laser, and the like.

In some implementations, light outputted by light source 202 can be conditioned (pre-processed) by one or more components or elements of a beam preparation stage 210 of the optical sensing system 200 to ensure a narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, crystal resonators), polarizers, feedback loops, lenses, mirrors, diffraction optical elements, and other optical devices. For example, if light source 202 is a broadband light source, the output light can be filtered to produce a narrowband beam. In some implementations, in which light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, light source 202 can produce (alone or in combination with beam preparation stage 210) a narrow-linewidth light with a linewidth below 100 KHz.

After the light beam is configured by beam preparation stage 210, the light beam can undergo spatial separation at a beam splitter 212, which directs a portion of the light beam towards beam splitter 214. Beam splitter 212 can be a 99:1 beam splitter, a 95:5 beam splitter, and/or some other beam splitter, with a small portion of the light beam directed towards beam splitter 214 to facilitate modulation optimization, while the main portion of the light beam can form a TX beam 230. In some implementations, beam splitter 214 can be a 50:50 beam splitter. Beam splitter 214 can create a first reference beam 216-1 and a second reference beam 216-2. The first reference beam 216-1 can be directed through an optical delay line 218 (e.g., a fiber-based delay line), which imparts a time delay Tref to the first reference beam 216-1. The first reference beam 216-1 and the second reference beam 216-2 can be used for monitoring the quality (e.g., linearity) of modulation, as disclosed in more detail below. Beam splitter 212 and/or beam splitter 214 can be a prism-based beam splitter, a partially-reflecting mirror, a polarizing beam splitter, a beam sampler, a fiber optical coupler (optical fiber adaptor), or any similar beam splitting element (or a combination of two or more beam-splitting elements).

TX beam 230, the first reference beam 216-1, and the second reference beam 216-2 can have the same modulation, e.g., frequency modulation, which can be imparted (as illustrated in FIG. 2) by light source 202 subject to a suitable control signal X(t) generated by an arbitrary waveform generator (AWG) 220. AWG 220 can include one or more local oscillators (e.g., voltage-controlled oscillators), mixers, amplifiers, filters, and the like. Control signal X(t) generated by AWG 220 can be an electrical signal, e.g., a voltage signal V (t) or a current signal I(t). Control signal X(t) can change the frequency of light generated by light source 202, e.g., by subjecting a laser component (e.g., an optical cavity) of light source 202 to an electric field (e.g., using a voltage signal), to thermal heating (e.g., using a current signal), and/or a combination thereof. Control signal X(t) can implement a target optical modulation $f_{target}(t)$ of TX beam 230 (and reference beams 216-*n*) in accordance with a programmed modulation scheme, which can include a series of linear chirps, e.g., ST chirps, UD chirps, or any other chirp sequence (such as a combination of up-chirps, down-chirps, and unmodulated flat portions of $f_{target}(t)$).

A beam splitter 240 can split off a small portion (e.g., 1 percent, 2 percent, 5 percent, etc.) from TX beam 230 to create a LO beam 242 to be used internally to facilitate detection of distances to and velocities of one or more objects 262 in the outside environment. The remaining TX beam 230 can be transmitted through an optical circulator 250 and an optical interface 260 towards object(s) 262.

Although not shown explicitly in FIG. 2 (and similarly, in FIG. 6), one or more optical amplifiers can be placed between various elements and components of the example sensing systems. For example, an optical amplifier may be placed between light source 202 and beam preparation stage 212, between beam preparation stage 210 and beam splitter 212, between beam splitter 212 and beam splitter 240, and/or other suitable locations.

Optical interface 260 can include one or more optical elements, e.g., apertures, lenses, mirrors, collimators, polarizers, waveguides, optical switches, optical phased arrays, and the like, or any such combination of optical elements. Optical interface 260 can include a transmitting (TX) interface that outputs TX beam 230 and a separate receiving (RX) interface that collects RX beam 264 reflected from object(s) 262. In some implementations, some of the optical elements (e.g., lenses, mirrors, collimators, optical fibers, waveguides, optical switches, optical phased arrays, beam splitters, and the like) can be shared by the TX interface and the RX interface. As shown in FIG. 2, in a combined TX/RX optical interface 260, TX beam 230 and RX beam 264 can follow (at least partially) the same optical path. TX beam 230 and RX beam 264 can be separated by optical circulator 250, which can be a Faraday effect-based device, a birefringent crystal-based device, or any other suitable device.

The first reference beam 216-1 beam and the second reference beam 216-2 can be processed by a tuning module that includes a first optical hybrid stage 270-1, a first coherent detection stage 280-1, and a first analog-to-digital converter (ADC) 282-1. Similarly, LO beam 242 and RX beam 264 can be processed by a detection module that includes a second optical hybrid stage 270-2, a second coherent detection stage 280-2, and a second ADC 282-2.

The first optical hybrid stage 270-1 can perform beam pre-conditioning, prior to processing the first reference beam 216-1 and the second reference beam 216-2 by the coherent detection stage 280-1. In some implementations, the first optical hybrid stage 270-1 (and/or the second optical hybrid stage 270-2) can be a 180-degree hybrid stage capable of detecting the absolute value of a phase difference of the input beams. In some implementations, the first optical hybrid stage 270-1 (and/or the second optical hybrid stage 270-2) can be a 90-degree optical hybrid stage capable of detecting both the absolute value and a sign of the phase difference of the input beams. For example, the first optical hybrid stage 270-1 (and/or the second optical hybrid stage 270-2) can be designed to split each of the input beams into multiple copies, e.g., four copies (in case of a 90-degree optical hybrid) or two copies (in case of a 180-degree optical hybrid). In particular, the first optical hybrid stage 270-1 (and/or the second optical hybrid stage 270-2) can apply controlled phase shifts (e.g., 90°, 180°, 270° phase shifts) to some of the copies, e.g., copies of the first reference beam 216-1, and then mix the phase-shifted copies of the first reference beam 216-1 with copies (e.g., unshifted copies) of the second reference beam 216-2. More specifically, the optical hybrid stage 270-1 can produce the in-phase symmetric and anti-symmetric combinations $(E_1+E_2)/2$ and $(E_1-E_2)/2$ of the first (time-delayed) reference beam 216-1 (whose electric field is denoted with $E_1$) and the second reference beam 216-2 (whose electric field is denoted with $E_2$). The optical hybrid stage 270-1 can also produce the quadrature 90-degree-shifted combinations $(E_1+iE_2)/2$ and $(E_1-iE_2)/2$ of the same beams (herein i is the imaginary unit number).

The first coherent detection stage 280-1 can receive four input combinations $E_1 \pm E_2$ and $E_1 \pm iE_2$ (in case of a 90-degree optical hybrid stage 270-1) or two combinations $E_1 \pm E_2$ (in case of a 180-degree optical hybrid stage 270-1). The first coherent detection stage 280-1 then processes the received inputs using one or more coherent light analyzers, such as balanced photodetectors, to extract a relative phase of the input beams, which can be representative of the delay time Tref caused by the first reference beam 216-1 passing through optical delay line 218. A balanced photodetector can have photodiodes connected in series and can generate alternating-current (AC) electrical signals that are proportional to a difference of intensities of the input optical modes (which can also be pre-amplified). A balanced photodetector can include photodiodes that are Si-based, InGaAs-based, Ge-based, Si-on-Ge-based, and other diodes (e.g. avalanche photodiodes). In some implementations, balanced photodetectors can be manufactured on a single chip, e.g., using complementary metal-oxide-semiconductor (CMOS) structures, silicon photomultiplier (SiPM) devices, or similar systems.

Each of the input signals can be received by respective photodiodes connected in series. An in-phase electric current I can be produced by a first pair of the photodiodes and a quadrature current Q can be produced by a second pair of photodiodes. Each of the currents can be further processed by one or more operational amplifiers, intermediate frequency amplifiers, and the like. The in-phase I and quadrature Q currents can then be combined into a complex reference photocurrent $J_{ref}$, $$J_{ref} = \left|\frac{E_1 + E_2}{2}\right|^2 - \left|\frac{E_1 - E_2}{2}\right|^2 + i\left|\frac{E_1 + iE_2}{2}\right|^2 - i\left|\frac{E_1 - iE_2}{2}\right|^2 = E_1 E_2^* \equiv I_{ref} + iQ_{ref},$$

having both the in-phase part $I_{ref}$ and the quadrature part $Q_{ref}$ and is, therefore, sensitive to both the absolute value and the sign of the phase difference of $E_1$ and $E_2$. Similarly, a 180-degree optical hybrid can facilitate generation of the in-phase part $I_{ref}$ part and not the quadrature part $Q_{ref}$, $$J_{ref} = \left|\frac{E_1 + E_2}{2}\right|^2 - \left|\frac{E_1 - E_2}{2}\right|^2 = Re[E_1 E_2^*] \equiv I_{ref},$$

which is sensitive to the absolute value of the phase difference but not to the sign of this phase difference. The argument of the complex reference photocurrent $J_{ref}(t)$ represents the delayed phase $\phi_1(t)$ of the first (delayed) reference beam 216-1 relative to the phase of second reference beam 216-2, arg $J_{ref}(t)=\phi_1(t)-\phi_2(t)$. Because of the presence of delay line 218, the phase of the first reference beam 216-1 can be the same, though delayed, as the phase of the second reference beam 216-2, $\phi_2(t)=\phi_1(t-\tau_{ref})$. The rate of the phase increase (e.g., of the first reference beam 216-1) is determined by the instantaneous frequency f(t) of the light beam, $$\phi_1(t) = \int_{t_0}^{t} dt' f(t'),$$

where to is some initial time constant. Accordingly, the derivative of the argument of the reference photocurrent is representative of the difference between the frequency of the first reference beam 216-1 (delayed by time $\tau_{ref}$) and the frequency of the second reference beam 216-2, $$\frac{d[\arg J_{ref}(t)]}{dt} = f(t-\tau_{ref}) - f(t).$$

For example, for the ST modulation, the derivative of the argument of the photocurrent can have the form (for one period T of modulation), $$\frac{d[\arg J_{ref}(t)]}{dt} = \begin{cases} \Delta f - \alpha\tau_{ref}, & 0 < t < \tau_{ref}, \\ -\alpha\tau_{ref}, & \tau_{ref} < t < T, \end{cases}$$

where the chirp rate $\alpha$ is determined by the chirp bandwidth $\Delta f$ and the period T of modulation, $\alpha=\Delta f/T$. Correspondingly, the argument of the reference photocurrent can have the form, $$\arg J_{ref}(t) = \arg J_{ref}(0) + \begin{cases} (\Delta f - \alpha\tau_{ref})t, & 0 < t < \tau_{ref}, \\ (\Delta f - \alpha t)\tau_{ref}, & \tau_{ref} < t < T. \end{cases}$$

Similar expressions can be obtained for other chirping schemes, e.g., UD modulation scheme, and so on.

The above two expressions for the argument of the photocurrent arg $J_{ref}(t)$ and/or the derivative of the reference photocurrent d[arg $J_{ref}(t)$]/dt illustrate target values that an ideal light source 202 can be capable of generating. Any actual light source 202 has a certain degree of dispersion (e.g., temporal dispersion) that causes the light beam to deviate somewhat from these ideal values. The deviations can be minimized or reduced using MO 124, e.g., as disclosed in more detail below. Additionally, operations of MO 124, as disclosed herein, can be used to compensate for potential nonlinearities of a response of light source 202 to control signals.

In some implementations, the reference photocurrent $J_{ref}(t)$ can be digitized using the first ADC 282-1 that produces a digitized electrical signal, referred to herein using the lowercase notation, $j_{ref}(t)$. The digitized signal $j_{ref}(t)$ can be provided to digital signal processing (DSP) 290, for accurate tuning of sensing beam modulation. DSP 290, and more specifically, MO 124, can compare an output of ADC 282-1 or some function $F_{measured}(t)$ of the output of ADC 282-1 with the target function $F_{target}(t)$ that corresponds to the desired modulation. In some implementations, $F_{measured}(t)$ and, similarly, $F_{target}(t)$, can be the argument of the (measured) reference photocurrent arg $J_{ref}(t)$ and the target photocurrent arg $J_{target}(t)$. In some implementations, $F_{measured}(t)$ and, similarly, $F_{target}(t)$, can be the derivative of the (measured) reference photocurrent d[arg $J_{ref}(t)$]/dt and, similarly, d[arg $J_{target}(t)$]/dt. In some implementations, $F_{measured}(t)$ and, similarly, $F_{target}(t)$, can represent any other convenient functions (capable of being measured by the tuning module) representative of the actual modulation and target modulation, respectively.

DSP 290 can include spectral analyzers, such as Fast Fourier Transform (FFT) analyzers, cross-correlators, and other circuits configured to process digital signals, including central processing units (CPUs), graphic processing units (GPUs), tensor processing units (TPUs), field-programmable gate arrays (FPGAs), application-specific integrated circuits (ASICs), etc., and memory devices. In some implementations, the processing and memory circuits can be implemented as part of a microcontroller.

Figure 3C:
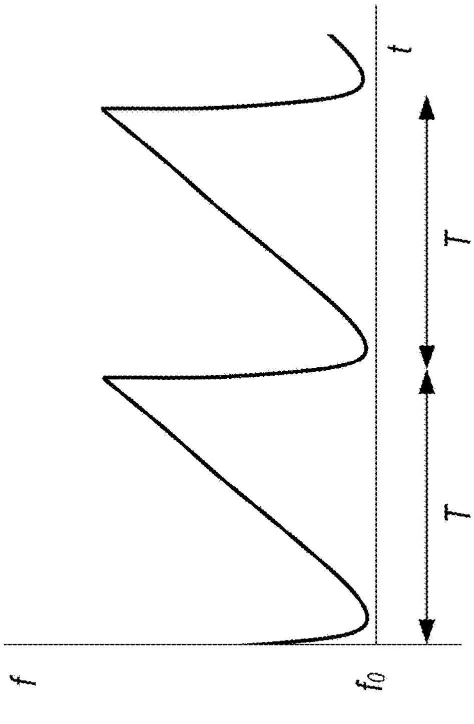
Figure 3D:
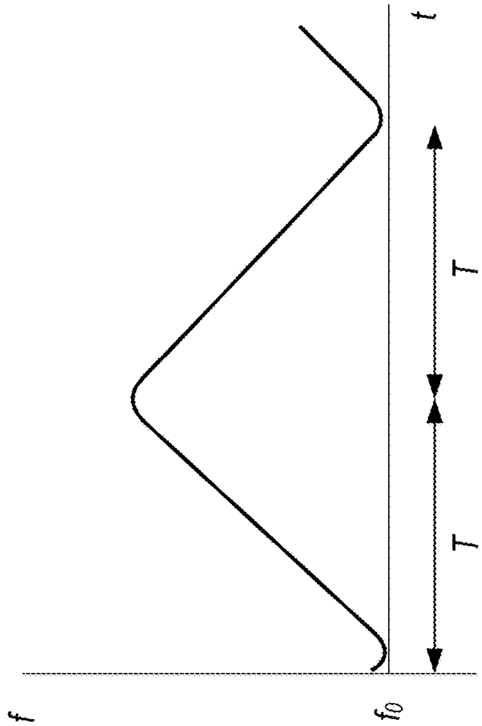

MO 124 can implement one or more algorithms that cause the measured function to evolve closer to the target function: $F_{measured}(t)=\rightarrow F_{target}(t)$. FIGS. 3A-3B depict graphs schematically showing target frequency modulations, with FIG. 3A depicting a target ST modulation and FIG. 3B depicting a target UD modulation. FIGS. 3C-3D depict graphs schematically showing measured frequency modulations that depart from the target frequency modulations, with FIG. 3C depicting a measured ST modulation and FIG. 3D depicting a measured UD modulation, for an example sensing system. As illustrated in FIGS. 3C-3D, in some instances, the most significant distortions of the frequency modulation f(t) can occur near singular points of f(t), e.g., near the points where f(t) or df(t)/dt are discontinuous.

To achieve efficient tuning of light source 202, MO 124 can model light source 202 as a linear time-invariant (LTI) system. In particular, a suitable response function F(t) associated with output of light source 202 (e.g., one of the functions referenced above, or some other function representative of the modulation of light source 202) can be a linear convolution, $$F(t) = \int_{-\infty}^{t} dt' h(t-t') X(t'),$$

of a control signal X(t) (e.g., an electrical, thermal, or any other signal capable of modulating light source 202), and a kernel h(t–t') (also commonly referred to as the impulse response of the LTI system). This dependence of the response function F(t) on the control signal X(t) represents the most general dispersive dependence that is subject only to time uniformity and linearity constraints. The impulse response h(t–t') can be measured for a specific light source 202, e.g., during manufacturing and/or calibration of sensing system 200, and can be stored in a memory accessible to MO 124, e.g., as part of calibration data 224.

Figure 4:
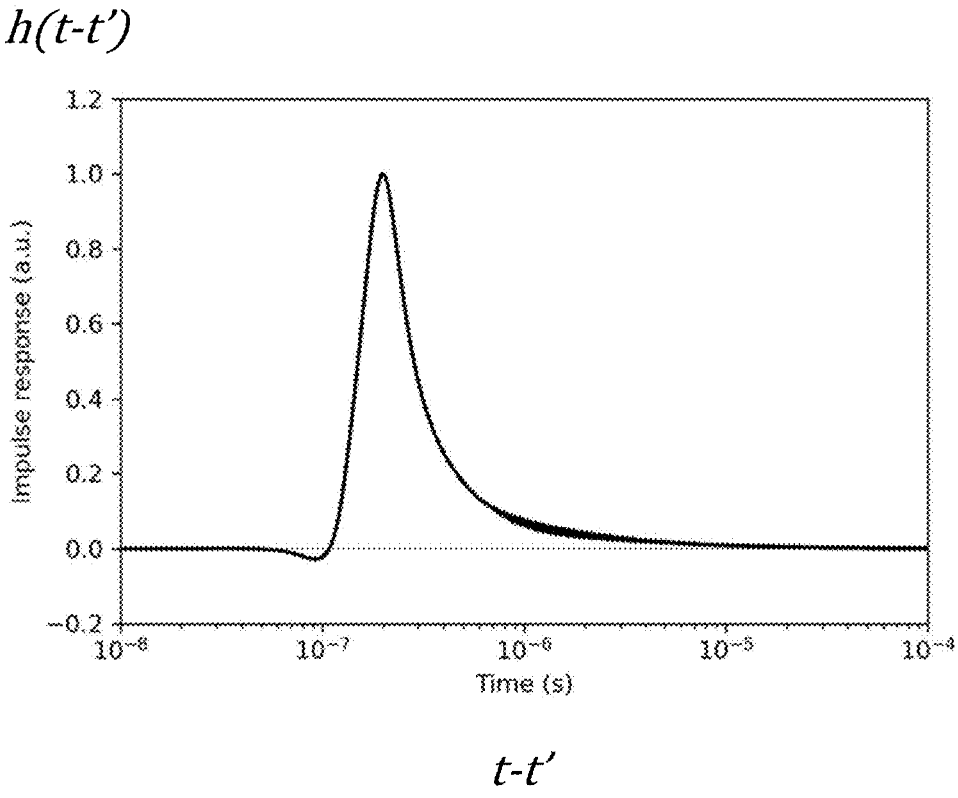
FIG. 4 illustrates an impulse response of an example distributed-feedback laser that can be used as part of the light source of the sensing system depicted in FIG. 2, in accordance with some implementations of the present disclosure.

FIG. 4 illustrates an impulse response h(t–t') of an example distributed-feedback laser that can be used as part of light source 202 of sensing system 200, in accordance with some implementations of the present disclosure. FIG. 4 illustrated the impulse response h(t–t') using the logarithmic time scale and depicts the impulse response (in arbitrary units) that develops after a certain time delay (of the order $\sim 10^{-7}$ sec) and decays after a certain time duration (of the order $\sim 10^{-5}$ sec). It should be understood that different light sources can be characterized by impulse responses that are significantly different from the example impulse response of FIG. 4.

In addition to measuring the impulse response h(t-t'), manufacturing and/or calibration of sensing system 200 can include identifying and storing a control signal X(t) that provides a desired target response of light source 220, such that, $$F_{target}(t) = \int_{-\infty}^{t} dt' h(t-t')X(t').$$

In particular, the techniques for determining X(t) may include solving the latter equation as the integral equation for X(t) (e.g., using the method of Fourier transforms or any other suitable techniques), tuning the control signal under laboratory conditions, or using some combination of these and/or other techniques.

During field operations of sensing system 200, the actual response $F_{measured}(t)$, e.g., measured from reference signal $J_{ref}(t)$, as disclosed above, may be different from the target response $F_{target}(t)$. This can be caused by a change of the impulse response of light source 202 away from the stored calibration value h(t–t') (e.g., caused by temporary changes in the environmental conditions and/or permanent aging of light source 202) and can result in the modulation departing from the target modulation.

To reduce the difference $F_{target}(t)-F_{measured}(t)$, MO 124 may use a loss function, $$L_1 = \left\| F_{target}(t) - F_{measured}(t) - \int_{-\infty}^{t} dt' h(t-t')y(t') \right\|^2,$$

where $\|g(t)\|^2$ denotes the time integral (e.g., taken over one period of modulation) of the squared absolute value of g(t), $$\|g(i)\| = \int_0^T dt|g(t)|^2,$$

with Y(t) denoting a tuning correction that is to be added to the control signal output of AWG 220: X(t)→X(t)+Y(t). Determination of the tuning correction Y(t) can be performed by optimizing (minimizing) the loss function $L_1$. In some implementations, to disfavor spurious oscillations in the tuning correction Y(t), the loss function can be modified with one or more additional terms that penalize such fast oscillations. For example, a loss function $L_2$ that includes the second derivative (and/or additional higher derivatives) integrated over the length of the period can be used:

$$L_2 = \left\| F_{target}(t)F_{measured}(t) - \int_{-\infty}^{t} dt' h(t-t')Y(t') \right\|^2 + \lambda \left\| \frac{d^2 Y(t)}{dt^2} \right\|^2.$$

A scaling value/can be chosen empirically, e.g., during laboratory or calibration testing, and can be stored together with the impulse response h(t–t') in the memory accessible to MO 124 (e.g., as part of calibration data 224). In some implementations, the scaling value λ and impulse response h(t–t') can be updated, e.g., periodically (during calibration sessions), to capture long-term changes of parameters of sensing system 200. Various integrals encountered in the convolutions of the tuning signal with the impulse response and/or in the loss function can be computed as discrete sums with suitably chosen discretization of time.

In some implementations, MO 124 can use one or more loss functions that are different from the squared error loss function, including but not limited to the absolute error loss function, the Huber loss function, the log-cosh loss function, and the like.

Figure 5A:
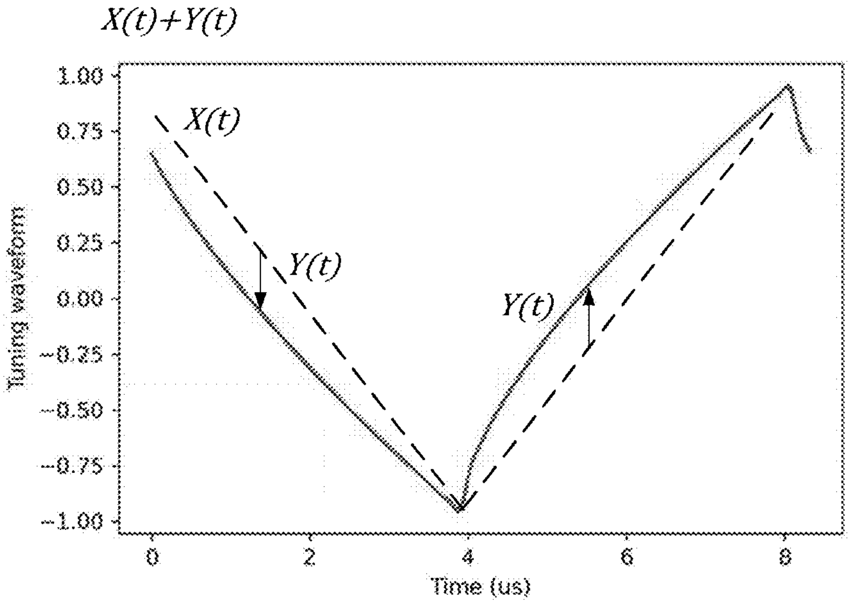
FIG. 5A illustrates an example tuned control signal determined to correct a linear control signal with a tuning correction.
Figure 5B:
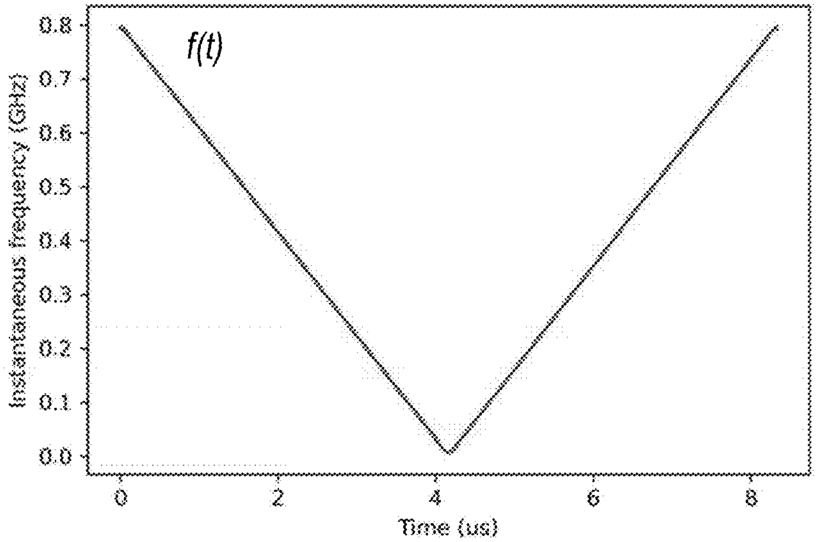
FIG. 5B illustrates a frequency modulation achieved with an example laser using the tuned controlled signal of FIG. 5A.

FIG. 5A illustrates an example tuned control signal X(t)+Y(t) (indicated with the solid line) determined to correct a linear control signal X(t) (indicated with the dashed line) with a tuning correction Y(t) (indicated with arrows). FIG. 5B illustrates frequency modulation f(t) achieved with an example laser using the tuned controlled signal X(t)+Y(t) of FIG. 5A.

In some implementations, determination of the tuning signal Y(t) can be performed iteratively, $Y(t)=Y_1(t)+Y_2(t)+\ldots$, e.g. with a first iteration value $Y_1(t)$ determined by minimizing a suitable loss function L (e.g., loss function $L_1$, loss function $L_2$, or some other loss function) based on detected function $F_{measured}(t)$. The control signal $X(t)+Y_1(t)$ is then applied by AWG 220 to light source 202 and the function $F_{measured}(t)$ is measured again. The optimization procedure is then repeated and a finer tuning correction $Y_2(t)$ is determined. The updated control signal $X(t)+Y_1(t)+Y_2(t)$ can then be applied by AWG 220 to light source 202, and so on. This iterative procedure may be continued until the loss function falls below an empirically determined threshold corresponding to a target accuracy of lidar sensing.

In some implementations, the tuning signal Y(t) can be determined at the start of a new lidar session, e.g., when sensing system 200 is being turned on. In some implementations, the tuning signal Y(t) can be determined each time any environmental conditions (e.g., ambient temperature, humidity, precipitation, etc.) change by more than a predetermined value and/or any time lidar conditions change, including but not limited to a change of temperature of the lidar, e.g., caused by solar irradiation, a mechanical impact, and so on). The tuning signal Y(t) can also be determined periodically or at a certain time interval after the previous tuning, even if the environmental and/or lidar conditions remain unchanged.

Returning again to FIG. 2, processing of LO beam 242 and RX beam 264 by the detection module (e.g., the second optical hybrid stage 270-2, the second coherent detection stage 280-2, and the second ADC 282-2) can be performed similarly to the processing of the first reference beam 216-1 and the second reference beam 216-2 by the tuning module. More specifically, the second optical hybrid stage 270-2 can perform pre-conditioning of LO beam 242 and RX beam 264. Coherent detection stage 280-2 can then process these beams to detect an I-Q photocurrent $$J_{RX} = E_{RX}E_{LO}^*$$

(if a 90-degree second optical hybrid stage 270-2 is used) or I-photocurrent $$J_{RX} = \mathrm{Re}\, E_{RX} E_{LO}^*$$

(if a 180-degree second optical hybrid stage 270-2 is used). Photocurrent $J_{RX}=I_{RX}+iQ_{RX}$ is representative of the phase difference between RX beam 264 and LO beam 242.

The photocurrent $J_{RX}(t)$ can be digitized using the second ADC 282-2 that produces a digitized electrical signal $j_{RX}(t)$. The digitized signal $j_{RX}(t)$ can be used to identify velocity of various objects 262 and distances to objects 262, e.g., based on the beating frequencies in the digitized signal $j_{RX}(t)$, such as beating frequencies associated with the up-chirp region and the down-chirp region of digitized signal $j_{RX}(t)$.

In some implementations, modulation of the light beam generated by light source 202 (and, optionally, conditioned by beam preparation stage 210) signals can be applied via one or more optical modulators, which can include an acousto-optic modulator (AOM), an electro-optic modulator (EOM), a Lithium Niobate modulator, a heat-driven modulator, a Mach-Zehnder modulator, and the like, or any combination thereof. In some implementations, the optical modulator(s) can include a quadrature amplitude modulator (QAM) or an in-phase/quadrature modulator (IQM).

Figure 6:
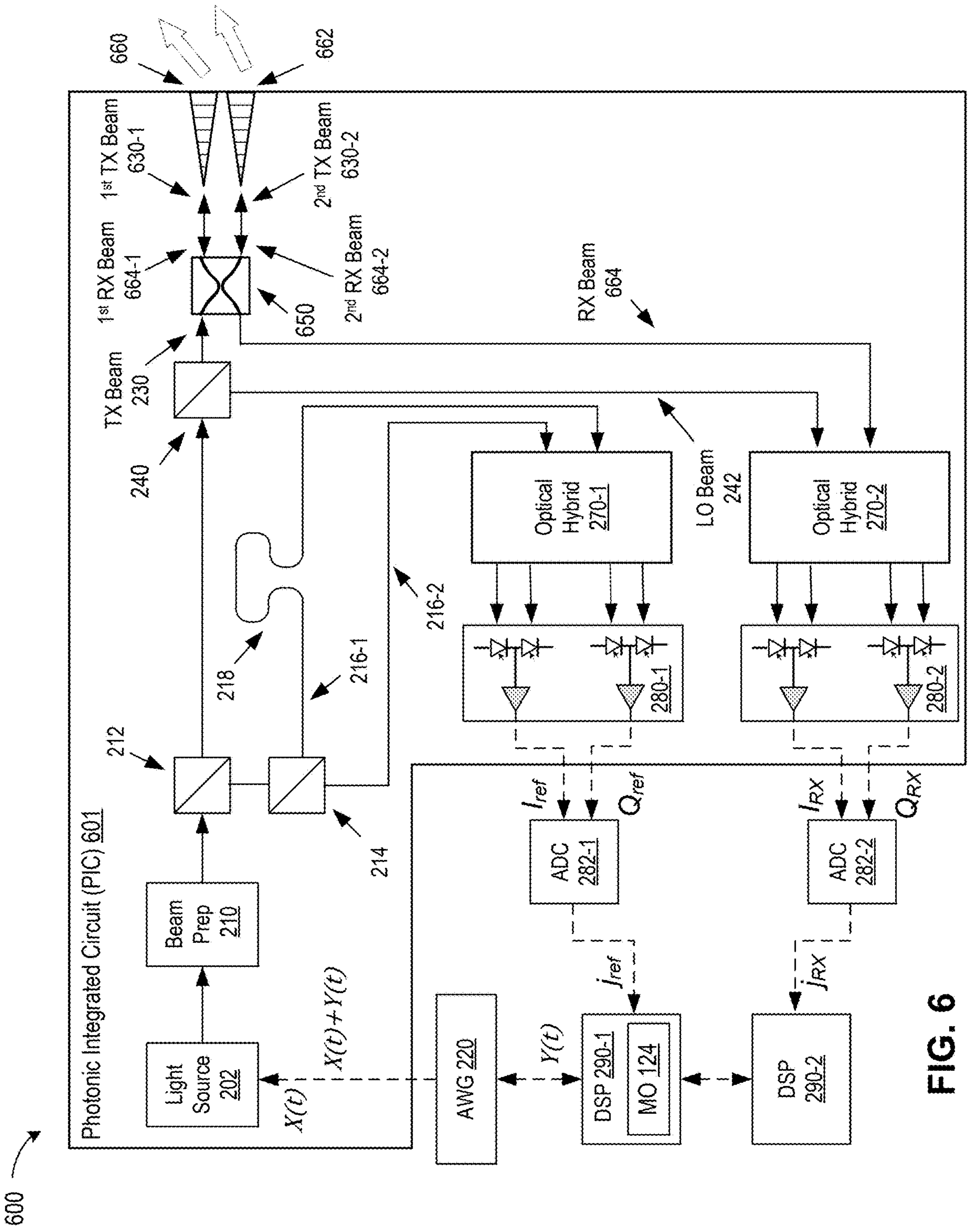
FIG. 6 is a block diagram illustrating an example optical sensing system implemented as part of a photonic integrated circuit and capable of accurate modulation of sensing beams with feedback optimization, in accordance with some implementations of the present disclosure.

FIG. 6 is a block diagram illustrating an example optical sensing system 600 implemented as part of a photonic integrated circuit (PIC) and capable of accurate modulation of sensing beams with feedback optimization, in accordance with some implementations of the present disclosure. PIC 601 can perform multiple passive and active optical functions to create one or more signals with desired amplitude, phase, spectral, and polarization characteristics. PIC 601 can include a number of waveguides, beam splitters, couplers, light switches, phase shifters, optical amplifiers, diffraction gratings, grating couplers, photodiodes, and other optical elements. Light source 202 can produce a beam of light, which can be further conditioned and preprocessed by beam preparation stage 210, e.g., as described above in conjunction with FIG. 2. In some implementations, as depicted in FIG. 6, light source 202 can be a light source (e.g., semiconducting laser, and laser diode) that is integrated on PIC 601. In some implementations, light source 202 can be located outside PIC 601 and the light produced by light source 202 can be delivered, e.g., via optical fiber or free space, to PIC 601, where the delivered light can be received through one or more one or more directional switches that direct the incoming light within a plane of the chip to a beam splitter 212. Light beams can propagate within PIC 601 over suitable single-mode or multi-mode waveguides, e.g., silicon (Si) waveguides. Beam splitter 212 can be a one-to-two power splitter, or any other suitable splitter. Various other components of PIC 601 that have the same numerals as the corresponding components of the sensing system 200 of FIG. 2 can have the same or a similar functionality.

Beam splitter 214 splits the light received from beam splitter 212 into first reference beam 216-1 (which is directed to delay line 218) and second reference beam 216-2, as described in conjunction with FIG. 2. Beam splitter 240 produces a TX beam 230 and a LO beam 242. TX beam 230 can be delivered to a directional coupler 650 that splits the TX beam 230 into multiple beams 630-*n*. Directional coupler 650 can receive the light on the coupler's input port and transmit a portion of the received light to an output port to produce a first TX beam 630-1. The remaining light is outputted by the coupled port of directional coupler 650 to generate α second TX beam 630-2. The fourth (isolated) port of directional coupler 650 can leak no or very little light. In some implementations, the power of the first TX beam 630-1 and the second TX beam 630-2 can be the same (or approximately the same). The first TX beam 630-1 and the second TX beam 630-2 can be delivered to a respective first interface coupler 660 and second interface coupler 662. In some implementations, the interface couplers 660 and 662 can be grating couplers or any other suitable directional switches configured to direct TX beams 632-*n* along the desired direction or several different directions in space. Each interface coupler can implement a different sensing pixel corresponding to a respective spatial direction probed by optical sensing system 600. In some implementations, interface couplers 660 and 662 can direct the first TX beam 630-1 and the second TX beam 630-2 towards any suitable collimating lenses, polarizers, and other optical elements.

The transmitted beams can interact with an object or multiple objects in the outside environment and generate reflected beams that can propagate back towards the optical sensing system 600. The reflected beams can be received through the same interface couplers 660 and 662 and propagate towards directional coupler 650 as part of a first RX beam 664-1 and a second RX beam 664-2. Directional coupler 650 can pass a portion (e.g., one-half) of each of the RX beams 664-*n* to the port that outputs a combined RX beam 664.

The first reference beam 216-1 and the second reference beam 216-2 can be processed by the tuning module that includes first optical hybrid stage 270-1, first coherent detection stage 280-1, first ADC 282-1, and first DSP 290-1, e.g., as described above in conjunction with FIG. 2. Similarly, LO beam 242 and combined RX beam 664 can be processed by the detection module that includes second optical hybrid stage 270-2, second coherent detection stage 280-2, second ADC 282-2, and second DSP 290-2, e.g., as described above in conjunction with FIG. 2. As illustrated in FIG. 6, the first DSP 290-1 (which implements MO 124) can use separate processing circuits than the second DSP 290-2. In some implementations, first DSP 290-1 and second DSP 290-2 can share the same processing circuits, e.g., as depicted in FIG. 2.

PICs (e.g., PIC 601) deployed in various optical sensing systems disclosed herein (or other similar sensing systems) can be implemented on a single chip (substrate), e.g., Silicon chip, Silicon Oxide chip, Indium Phosphate chip, Silicon Nitride chips, diamond-based chips, and the like, and can integrate multiple optical elements and functions. PICs can be manufactured using multiple materials, e.g., III-V compound semiconductors (GaAs, InSb, etc.) integrated with Silicon or Germanium. The chip can be manufactured using any suitable methods of lithography, epitaxy, physical vapor deposition, chemical vapor deposition, plasma-assisted deposition, or any other suitable techniques of wafer-scale technology. PICs can operate in the visible light domain (300-700 nm wavelength) or in the infrared domain (above 1000 nm). PICs can include components designed and manufactured to generate light, guide light, manipulate light by changing amplitude, frequency, phase, polarization, spatial and temporal extent of light, transform energy of light into other forms, such as energy of electric current, energy of mechanical vibrations, heat and the like.

PICs can include any number of integrated light sources, such as light-emitting diodes (LEDs), semiconductor lasers diodes, quantum dot lasers (e.g., quantum dot lasers monolithically grown on Silicon), Germanium-on-Silicon lasers, Erbium-based lasers, Raman lasers, integrated III-V compound semiconductors on Si substrate, and the like. In some implementations, PICs can operate on light generated by lasers and other light sources located off-chip and delivered to PICS via any number of optical switches and optical fibers.

PICs can include any number of waveguides, which can serve as elemental building blocks of a PIC's light transportation system, connecting various elements and components. Waveguides can include metallic waveguides, dielectric waveguides, doped semiconductor waveguides, and the like. Waveguides can be single-mode waveguides or multimode waveguides. Waveguides can be passive waveguides or active waveguides with gain medium, which can increase the amplitude of the light guided therethrough. Dielectric waveguides can be engineered with high refractive index layers surrounded by lower refractive index materials, which can be deposited and shaped to a designed form using deposition and etching manufacturing techniques.

PICs can include any number of beam splitters, e.g., power splitters, beam combiners, directional couplers, grating couplers, and the like. PICs can include optical circulators, e.g., Faraday effect-based circulators, birefringent crystal-based circulators, and so on. PICs can include any number of optical amplifiers, such as Erbium-doped amplifiers, waveguide-integrated amplifiers, saturation amplifiers, and the like. PICs can further include any number of phase shifters, such as optomechanical phase shifters, electro-optical phase shifters, e.g., shifters operating by exercising electrical or mechanical control of the refractive index of an optical medium, and the like.

PICs can include any number of optical modulators, including indium phosphide modulators, Lithium Niobate modulators, Silicon-based modulators, acousto-optic modulators, electro-optic modulators, electro-absorption modulators, Mach-Zehnder modulators, and the like. In some implementations, optical modulators can use carrier injection, radiation amplification, and other techniques. Optical modulators can include various optomechanical components, e.g., components that modulate the refractive index of a waveguide due to the displacement of a mechanically moveable part placed next to the waveguide, which in turn induces a phase shift (or a directional shift) to the propagating light field.

PICs can include any number of single-photon detectors, e.g., superconducting nanowire single-photon detectors (SNSPDs) or superconducting film single-photon detectors, which can be integrated with diamond or silicon substrates. PICs can include any number of interferometers, such as Mach-Zehnder interferometers.

PICs can include any number of multiplexers/demultiplexers, including wavelength division multiplexers/demultiplexers, phased-array wavelength multiplexers/demultiplexers, wavelength converters, time division multiplexers/demultiplexers, and the like.

PICs can further include any number of photodetectors, including silicon photomultipliers, photodiodes, which can be Silicon-based photodiodes, Germanium-based photodiodes, Germanium-on-Silicon-based photodiodes, III-V semiconductor-based (e.g., GaAs-based) photodiodes, avalanche photodiodes, silicon photomultipliers (SiPMs), and so on. Photodiodes can be integrated into balanced photodetector modules, which can further include various optical hybrids, e.g., 90-degree hybrids, 180-degree hybrids, and the like.

Figure 7:
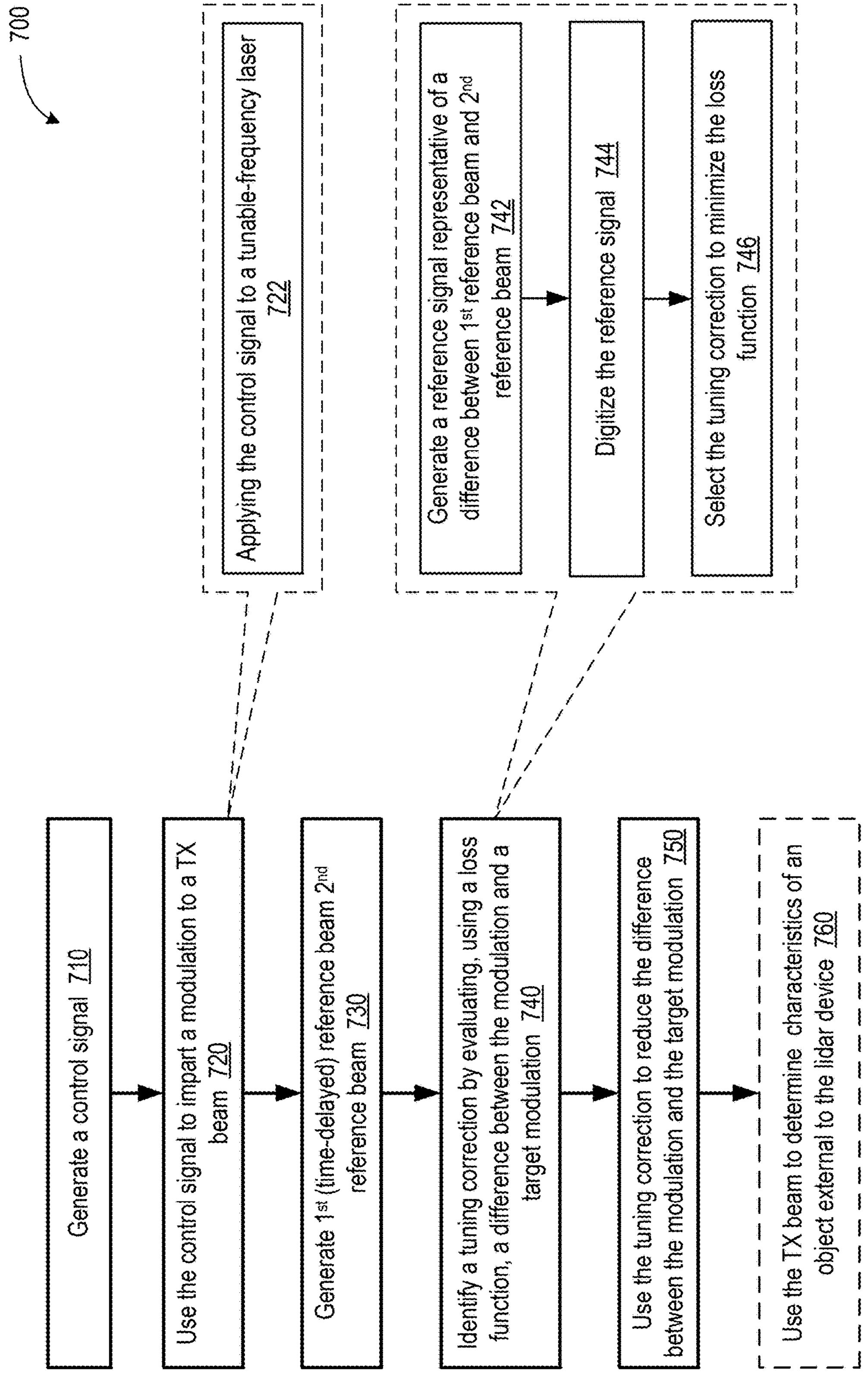
FIG. 7 depicts a flow diagram of an example method of accurate modulation of sensing beams with feedback optimization, in accordance with some implementations of the present disclosure.

FIG. 7 depicts a flow diagram of an example method 700 of accurate modulation of sensing beams with feedback optimization, in accordance with some implementations of the present disclosure. Method 700 can be performed using systems, optical components, and various electronic circuits described in relation to FIG. 1-6, e.g., optical components and electronic circuits of system 200 of FIG. 2, optical components and electronic circuits of sensing system 600 of FIG. 6, and/or various modifications or combinations of the aforementioned sensing systems, which can be implemented, e.g., as part of a lidar apparatus. Method 700 can be performed in the course of obtaining range and velocity data that characterizes any suitable environment, e.g., an outside environment of a moving vehicle, including but not limited to an autonomous vehicle. Various operations of method 700 can be performed in a different order compared with the order shown in FIG. 7. Some operations of method 700 can be performed concurrently with other operations. In some implementations, some operations of method 700 are not always performed. Method 700 can be used to improve efficiency and reliability of velocity and distance detections by lidar devices.

Method 700 can include generating, at block 710, a control signal. In some implementations, the control signal (e.g., X(t)) can be generated by AWG 220 or any other generator of time-dependent electrical signals, which can include voltage signals and/or current signals. At block 720, method 700 can include using the control signal to impart a modulation to a transmitted (TX) beam produced by the lidar device (e.g., TX beam 230 in FIG. 2). In some implementations, the modulation can include a frequency modulation having one or more periodically repeated linear chirps, e.g., chirps of the ST modulation illustrated in FIG. 3A and FIG. 3C or chirps of the UD modulation illustrated in FIG. 3B and FIG. 3D. In some implementations, as illustrated with block 722 of the top callout portion of FIG. 7, operations of block 720 can include applying the control signal to a tunable-frequency laser that produces the TX beam. In some implementations, the TX beam is produced by a tunable-frequency light-generation subsystem, which can include one or more light sources (e.g., lasers, light-emitting diodes, and the like), a beam preparation stage, and one or more optical amplifiers. In such implementations, the control signal can be applied to the one or more optical modulators that modulate the TX beam.

At block 730, method 700 can include generating, using the modulated TX beam, a first reference beam (e.g., first reference beam 216-1) and a second reference beam (e.g., second reference beam 216-1). The first reference beam can be time-delayed relative to the second reference beam.

At block 740, method 700 can include identifying, using the first reference beam and the second reference beam, a tuning correction (e.g., Y(t)) to the control signal (e.g., X(t)). In some implementations, identifying the tuning correction can include evaluating, based on a loss function, a difference between the modulation and a target modulation (e.g., comparing actual modulation, as illustrated schematically in FIG. 3C and/or FIG. 3D, with target modulation, as illustrated schematically in FIG. 3A and/or FIG. 3B). In some implementations, identifying the tuning correction can include using a linear time-invariant model to characterize a response of the tunable-frequency laser (or any other tunable-frequency light-generation subsystem that is being used) to the control signal. In some implementations, identifying the tuning correction can include performing one or more operations illustrated with the bottom callout portion of FIG. 7. In particular, at block 742, method 700 can include generating a reference signal having a phase information that is representative of a difference between the first reference beam and the second reference beam. For example, a combination of a 90-degree (or 180-degree) optical hybrid 270-1 and an optical coherent stage 280-1 can generate reference signal $J_{ref}=I_{ref}+iQ_{ref}$ (or $J_{ref}=I_{ref}$) that carries the phase information representative of the difference between the first reference beam and the second reference beam, e.g., as described in conjunction with FIG. 2 and FIG. 6. At block 744, method 700 can include digitizing the reference signal to obtain a digitized reference signal. For example, ADC 282-1 can digitize reference signal $J_{ref}$ to obtain digitized reference signal $j_{ref}$.

At block 746, method 700 can include selecting the tuning correction (e.g., Y(t)) to minimize the loss function (e.g., loss function $L_1$, loss function $L_2$, or some other suitable loss function). In some implementations, the loss function can include a plurality of contributions (e.g., a discretized integral $\Sigma_{t_i}|g(t_i)|^2$ computed for one or more modulation periods or a fraction of the modulation period). Each of the plurality of contributions (associated with respective times $t_i$) can evaluate a difference between a target reference signal (e.g., $j_{target}(t_i)$) and the digitized reference signal (e.g., $j_{ref}(t_i)$). The difference can be modified using the tuning correction $Y(t_i)$ for various times $t_i$ of the modulation. For example, the loss function can evaluate $g(t_i)=j_{target}(t_i)-j_{ref}(t_i)-\Sigma_{t'} h(t_i-t_i')Y(t')$. In some implementations, the loss function can associate a cost with a curvature (nonzero second and/or higher derivatives) of the tuning correction. For example, the loss function can include an additional contribution that evaluates the second derivative of $g(t_i)$, e.g., the discretized second derivative, by including a contribution $\lambda\Sigma_{t_i}|g(t_{i+1})+g(t_{i-1})-2g(t_i)|^2$, or any other similar contribution. In some implementations, any suitable function $F_{measured}(t_i)$ obtained using $j_{ref}(t_i)$ (and, similarly, any suitable function $F_{target}(t_i)$ associated with $j_{target}(t_i)$) can be used in place of $j_{ref}(t_i)$ (and, similarly, $j_{target}(t_i)$) in the operations of block 746.

At block 750, method 700 can continue with using the tuning correction to reduce the difference between the modulation and the target modulation. For example, the tuning correction can be used to modify the output of AWG 220 (or any other generator of time-dependent electrical signals), including voltage signals and/or current signals: $X(t)\rightarrow X(t)+Y(t)$. In some implementations, the tuning correction can be determined iteratively. At block 760, method 700 can include using the TX beam to determine one or more characteristics of an object external to the lidar device (e.g., a distance of the object, a velocity of the object, a reflectivity of the object, and so on).

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

one or more electronic circuits configured to:

generate a control signal to impart a modulation to a transmitted (TX) beam; and an optical system configured to:

generate, using the TX beam, a first reference beam and a second reference beam, wherein the first reference beam is time-delayed relative to the second reference beam; and wherein the one or more electronic circuits are further configured to:

identify, using the first reference beam and the second reference beam, a tuning correction to the control signal, wherein to identify the tuning correction the one or more electronic circuits are configured to evaluate, based on a loss function, a difference between the modulation and a target modulation, wherein the loss function associates a cost with a curvature of the tuning correction; and use the tuning correction to reduce the difference between the modulation and the target modulation.

2. The system of claim 1, wherein to impart the modulation to the TX beam, the one or more electronic circuits are further configured to:

apply the control signal to a tunable-frequency laser, wherein the control signal is one of at least a voltage signal or a current signal.

3. The system of claim 1, wherein the optical system comprises a tunable-frequency laser configured to generate the TX beam, and wherein to identify the tuning correction, the one or more electronic circuits are further configured to:

use a linear time-invariant model to characterize a response of the tunable-frequency laser to the control signal.

4. The system of claim 1, wherein the modulation comprises a frequency modulation having one or more periodically repeated linear chirps.

5. The system of claim 1, wherein to identify the tuning correction, the one or more electronic circuits are further configured to:

obtain a reference signal representative of a difference between the first reference beam and the second reference beam;

digitize the reference signal to obtain a digitized reference signal; and select the tuning correction to minimize the loss function, wherein the loss function comprises a plurality of contributions, and wherein each of the plurality of contributions evaluates a difference between a target reference signal and the digitized reference signal modified using the tuning correction for each time of a plurality of times of the modulation.

6. The system of claim 1, wherein the loss function is one of a squared error loss function or an absolute error loss function.

7. The system of claim 1, wherein the one or more electronic circuits are further configured to:

use the TX beam to determine one or more characteristics of an object, the one or more characteristics of the object comprising at least one of a distance to the object or a velocity of the object.

8. The system of claim 1, wherein the one or more electronic circuits are configured to identify the tuning correction iteratively, using two or more iterations.

9. A lidar apparatus comprising:

a photonic integrated circuit (PIC) comprising:

a light source configured to generate α transmitted (TX) beam;

one or more beam splitters configured to generate, using the TX beam, a first reference beam and a second reference beam;

an optical delay line configured to time-delay the first reference beam relative to the second reference beam; and a coherent photodetector stage configured to obtain a phase information representative of a difference between the first reference beam and the second reference beam; and one or more electronic circuits configured to:

generate α control signal that causes a modulation to be imparted to the TX beam, the first reference beam, and the second reference beam;

identify, using the phase information, a tuning correction to the control signal, wherein to identify the tuning correction the one or more electronic circuits are configured to;

obtain a reference signal comprising the phase information representative of the difference between the first reference beam and the second reference beam;

digitize the reference signal to obtain a digitized reference signal; and select the tuning correction to minimize the loss function, wherein the loss function comprises a plurality of contributions, and wherein each of the plurality of contributions evaluates a difference between a target reference signal and the digitized reference signal modified using the tuning correction for each time of a plurality of times of the modulation; and use the tuning correction to reduce the difference between the modulation and the target modulation.

10. The lidar apparatus of claim 9, wherein the light source comprises a tunable-frequency light-generation subsystem, and wherein to identify the tuning correction, the one or more electronic circuits are further configured to:

use a linear time-invariant model to characterize a response of the tunable-frequency light-generation subsystem to the control signal.

11. A method comprising:

generating a control signal;

using the control signal to impart a modulation to a transmitted (TX) beam produced by a lidar device;

generating, using the modulated TX beam, a first reference beam and a second reference beam, wherein the first reference beam is time-delayed relative to the second reference beam;

identifying, using the first reference beam and the second reference beam, a tuning correction to the control signal, wherein identifying the tuning correction comprises evaluating, based on a loss function, a difference between the modulation and a target modulation, wherein the loss function associates a cost with a curvature of the tuning correction; and using the tuning correction to reduce the difference between the modulation and the target modulation.

12. The method of claim 11, wherein using the control signal comprises:

applying the control signal to a tunable-frequency laser, and wherein the control signal is one of at least a voltage signal or a current signal.

13. The method of claim 12, wherein identifying the tuning correction comprises using a linear time-invariant model to characterize a response of the tunable-frequency laser to the control signal.

14. The method of claim 11, wherein the modulation comprises a frequency modulation having one or more periodically repeated linear chirps.

15. The method of claim 11, wherein identifying the tuning correction comprises:

generating a reference signal representative of a difference between the first reference beam and the second reference beam;

digitizing the reference signal to obtain a digitized reference signal; and selecting the tuning correction to minimize the loss function, wherein the loss function comprises a plurality of contributions, and wherein each of the plurality of contributions evaluates a difference between a target reference signal and the digitized reference signal modified using the tuning correction for each time of a plurality of times of the modulation.

16. The method of claim 11, wherein the loss function is one of a squared error loss function or an absolute error loss function.

17. The method of claim 11, further comprising:

using the TX beam to determine one or more characteristics of an object external to the lidar device.

* * * * *